(12) United States Patent
Liu et al.

(10) Patent No.: US 11,810,384 B2
(45) Date of Patent: Nov. 7, 2023

(54) METHOD AND APPARATUS FOR RECOGNIZING TEXT CONTENT AND ELECTRONIC DEVICE

(71) Applicant: Beijing Baidu Netcom Science and Technology Co., Ltd., Beijing (CN)

(72) Inventors: Shanshan Liu, Beijing (CN); Chengquan Zhang, Beijing (CN); Xuan Li, Beijing (CN); Mengyi En, Beijing (CN); Hailun Xu, Beijing (CN); Xiaoqiang Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 333 days.

(21) Appl. No.: 17/172,031

(22) Filed: Feb. 9, 2021

(65) Prior Publication Data
US 2021/0334602 A1     Oct. 28, 2021

(30) Foreign Application Priority Data

Apr. 28, 2020   (CN) .......................... 202010349150.9

(51) Int. Cl.
  *G06V 30/414*   (2022.01)
  *G06V 30/24*    (2022.01)
  (Continued)

(52) U.S. Cl.
  CPC .......... *G06V 30/414* (2022.01); *G06F 18/214* (2023.01); *G06F 18/2178* (2023.01); *G06V 30/2504* (2022.01); *G06V 2201/02* (2022.01)

(58) Field of Classification Search
  CPC ........ H04Q 9/00; H04Q 2200/60; G01D 9/42; G01D 4/002; G06F 9/451; G06F 3/0482
  See application file for complete search history.

(56) References Cited

U.S. PATENT DOCUMENTS

| | | | |
|---|---|---|---|
| 7,028,250 B2* | 4/2006 | Ukrainczyk | G06F 16/353 707/E17.084 |
| 7,400,768 B1* | 7/2008 | Mayzlin | G06V 30/18076 382/177 |

(Continued)

FOREIGN PATENT DOCUMENTS

| | | |
|---|---|---|
| CN | 105574526 A | 5/2016 |
| CN | 106485246 A | 3/2017 |

(Continued)

OTHER PUBLICATIONS

Japanese Office Action corresponding to Japanese Patent Application No. 2021-043037, dated Mar. 10, 2022 (3 pages).

(Continued)

Primary Examiner — Yosef Kassa
(74) Attorney, Agent, or Firm — Maginot, Moore & Beck LLP

(57) ABSTRACT

The present application discloses a method and an apparatus for recognizing text content, and an electronic device, and relates to a text recognition technique in the field of computer technology. The specific implementation is as follows: acquiring a dial picture; detecting at least one text centerline and a bounding box corresponding to each text centerline in the dial picture; and recognizing text content in each line of text in the dial picture based on the at least one text centerline and the bounding box corresponding to each text centerline.

17 Claims, 4 Drawing Sheets

(51) Int. Cl.
*G06F 18/21* (2023.01)
*G06F 18/214* (2023.01)

(56) References Cited

U.S. PATENT DOCUMENTS

| | | | | |
|---|---|---|---|---|
| 7,454,063 | B1* | 11/2008 | Kneisl | G06V 30/2272 |
| | | | | 382/229 |
| 7,644,053 | B2* | 1/2010 | Kipersztok | G06F 40/30 |
| | | | | 706/50 |
| 8,271,902 | B1* | 9/2012 | Mangini | G06F 3/04847 |
| | | | | 715/764 |
| 8,670,597 | B2* | 3/2014 | Petrou | G06V 20/30 |
| | | | | 382/116 |
| 8,897,563 | B1* | 11/2014 | Welling | G06V 30/182 |
| | | | | 382/176 |
| 8,977,639 | B2* | 3/2015 | Petrou | G06F 16/95 |
| | | | | 707/765 |
| 9,087,057 | B2* | 7/2015 | Ozaki | G06F 16/41 |
| 9,135,277 | B2* | 9/2015 | Petrou | G06F 16/532 |
| 9,183,224 | B2* | 11/2015 | Petrou | G06F 16/50 |
| 2013/0210507 | A1 | 8/2013 | Wayans | |
| 2016/0210507 | A1 | 7/2016 | Abdollahian | |
| 2021/0004629 | A1 | 1/2021 | Sun et al. | |

FOREIGN PATENT DOCUMENTS

| | | | |
|---|---|---|---|
| CN | 107967471 | A | 4/2018 |
| CN | 108805131 | A | 11/2018 |
| CN | 109993040 | A | 7/2019 |
| CN | 110033000 | A | 7/2019 |
| CN | 110197227 | A | 9/2019 |
| CN | 110378338 | A | 10/2019 |
| CN | 10458011 | A | 11/2019 |
| CN | 110598690 | A | 12/2019 |
| CN | 110647829 | A | 1/2020 |
| CN | 110929665 | A | 3/2020 |
| CN | 111027456 | A | 4/2020 |
| CN | 111027613 | A | 4/2020 |

OTHER PUBLICATIONS

English Translation of Japanese Office Action corresponding to Japanese Patent Application No. 2021-043037, dated Mar. 10, 2022 (3 pages).
Feng, Wei, et al. "Textdragon: An end-to-end framework for arbitrary shaped text spotting." Proceedings of the IEEE/CVF International Conference on Computer Vision. 2019. (10 Pages).
Extended European Search Report corresponding to European Patent Application No. 21156038.8, dated Jul. 15, 2021 (8 pages).
Chinese Office Action corresponding to Chinese Patent Application No. 2020103491509, dated Mar. 16, 2023 (7 pages).
English Translation of Chinese Office Action corresponding to Chinese Patent Application No. 2020103491509, dated Mar. 16, 2023 (3 pages).
European Office Action corresponding to European Patent Application No. 21156038.8, dated Mar. 17, 2023 (7 pages).
Tensmeyer, Chris, and Tony Martinez. "Document image binarization with fully convolutional neural networks." 2017 14th IAPR international conference on document analysis and recognition (ICDAR). vol. 1. IEEE, 2017.
English Translation of CN105574526A. (20 Pages).
English Translation of CN106485246A. (28 Pages).
English Translation of CN108805131A. (21 Pages).
English Translation of CN110033000A. (13 Pages).
English Translation of CN110378338A. (45 Pages).
English Translation of CN110598690A. (13 Pages).
English Translation of CN110647829A. (18 Pages).
English Translation of CN111027613A. (26 Pages).

* cited by examiner

METHOD AND APPARATUS FOR RECOGNIZING TEXT CONTENT AND ELECTRONIC DEVICE

CROSS-REFERENCE TO RELATED APPLICATION

This application claims a priority to Chinese Patent Application No. 202010349150.9 filed on Apr. 28, 2020, the disclosure of which is incorporated in its entirety by reference herein.

TECHNICAL FIELD

The present application relates to a text recognition technique in the field of computer technology, and in particular to a method and an apparatus for recognizing text content, and an electronic device.

BACKGROUND

A dashboard, as a metering apparatus, is widely used in various fields, including machinery manufacturing, water systems, power systems, automobiles, medical treatment, and so on. At present, with the development of instrument measurement technology, traditional pointer-type dashboards are being gradually replaced by digital dashboards, which display metering contents, such as metering index items and metering values, through provided dials such as liquid crystal panels.

In order to improve instrument reading efficiency of the dashboard, a current common approach is to collect a picture of the dashboard by means of a data collection apparatus installed in the dashboard and then recognize a metering content in the picture of the dashboard through an electronic device such as a server. However, in a current process of recognizing the metering content in the dashboard, errors are prone to occur in the recognition of the metering content, thereby reducing the accuracy of recognizing the metering content of the dashboard.

It can be seen that there is a problem of low recognition accuracy in the current process of recognizing the metering content of the dashboard.

SUMMARY

According to a first aspect, there is provided a method for recognizing text content applied to an electronic device, including: acquiring a dial picture; detecting at least one text centerline and a bounding box corresponding to each text centerline in the dial picture; and recognizing text content in each line of text in the dial picture based on the at least one text centerline and the bounding box corresponding to each text centerline.

According to a second aspect, there is further provided an apparatus for recognizing text content, applied to an electronic device, including: a picture acquisition module, configured to acquire a dial picture; a detection module, configured to detect at least one text centerline and a bounding box corresponding to each text centerline in the dial picture; and a recognition module, configured to recognize text content in each line of text in the dial picture based on the at least one text centerline and the bounding box corresponding to each text centerline.

According to a third aspect, there is further provided an electronic device, including: at least one processor; and a memory communicatively coupled to the at least one processor, wherein the memory has instructions stored thereon and executable by the at least one processor, which are executed by the at least one processor to enable the at least one processor to perform the method according to the first aspect.

In a fourth aspect, the present application provides a non-transitory computer-readable storage medium having computer instructions stored thereon, which are used to enable the method according to the first aspect to be performed by the computer.

It should be understood that the content described in this section is not intended to identify key or important features of the embodiments of the present disclosure, nor is it intended to limit the scope of the present disclosure. Other features of the present disclosure will be readily understood from the following description.

BRIEF DESCRIPTION OF THE DRAWINGS

The accompanying drawings are provided for better understanding the solution, and do not constitute a limitation on the present application. In the drawings.

DETAILED DESCRIPTION

Exemplary embodiments of the present application are described hereinafter in conjunction with the accompanying drawings, wherein various details of the embodiments of the present application are included to assist in the understanding, but they should be regarded as exemplary only. Therefore, those having ordinary skills in the art should realize that various changes and modifications can be made to the embodiments described herein without departing from the scope and spirit of the present application. In addition, descriptions of well-known functions and constructions are omitted for clarity and conciseness.

Figure 1:
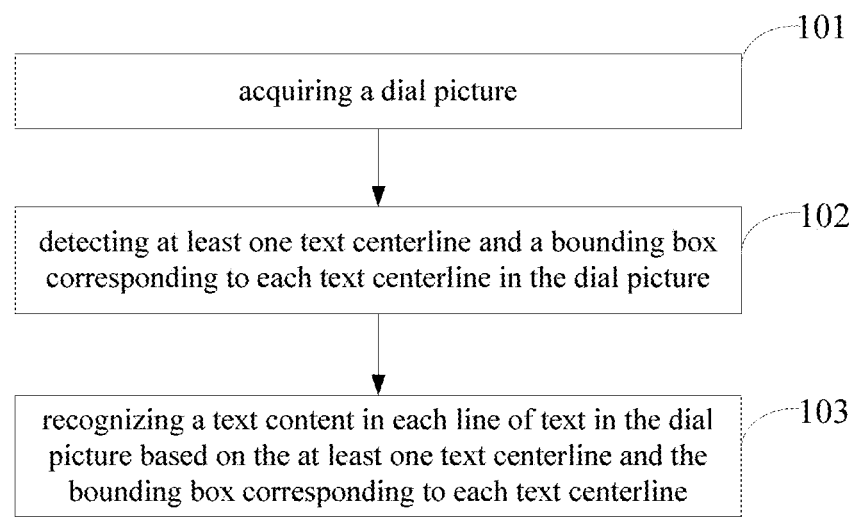
FIG. 1 is a first schematic diagram according to a first embodiment of the present application.

Please refer to FIG. 1, an embodiment of the present application provides a method for recognizing text content, which can be applied to an electronic device. As shown in FIG. 1, the method for recognizing the text content includes the following steps 101 to 103.

In Step 101, a dial picture is acquired.

In the present application, when receiving a picture captured of a dashboard, the electronic device can acquire a dial picture from the captured picture of the dashboard, wherein the dial picture includes an image of an area where a dial of the dashboard is located in the captured picture, and the dial refers to an area where a display screen of the dashboard is located.

Figure 2:
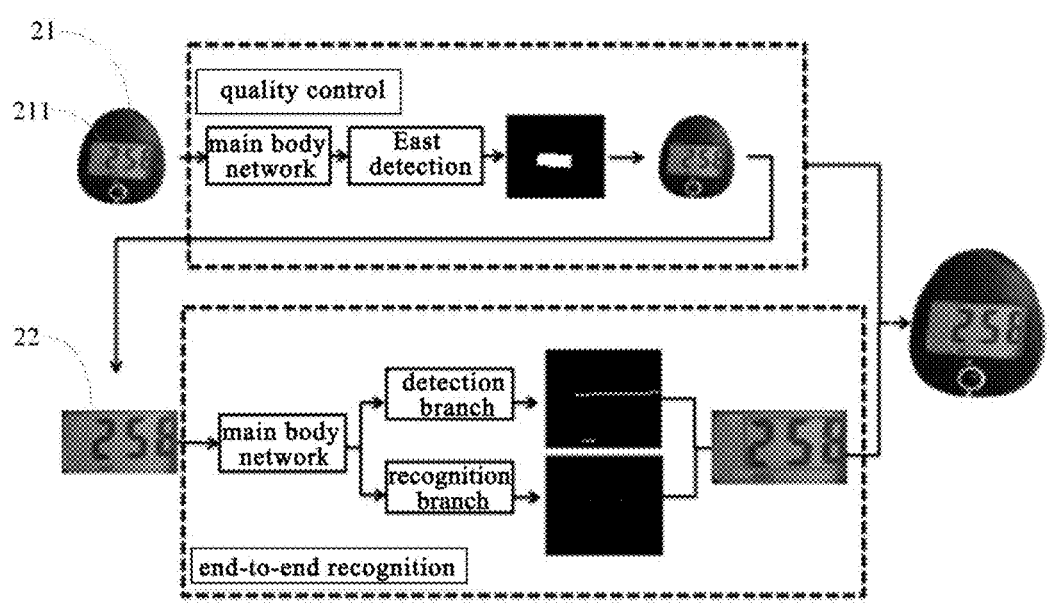
FIG. 2 is a second schematic diagram according to the first embodiment of the present application.

For example, as shown in FIG. 2, the electronic device receives an input captured picture 21 of the dashboard, and generates a dial picture 22 from an image 211 of an area where the dial is located in the captured picture 21.

It should be noted that the acquisition of the dial picture from the captured picture of the dashboard by the electronic device may be receiving, by the electronic device, a marking operation made by an operator in the captured picture and used to mark the image of the area where the dial of the dashboard is located in the captured picture, and generating, by the electronic device, the dial picture from the marked image in response to the marking operation.

Alternatively, in some embodiments, the above step 101 may include: performing multi-scale feature processing on picture features of a captured picture of a dashboard to obtain a captured picture with multi-scale features when receiving the captured picture of the dashboard; performing feature classification and regression processing on the captured picture with the multi-scale features to determine a dial area in the captured picture; and outputting a picture of the dial area as the dial picture.

Here, the electronic device can perform multi-scale feature processing, centerline detection, and bounding box regression processing on the captured picture of the dashboard, so as to allow a position of the dial of the dashboard in the captured picture to be accurately recognized and the accuracy in the recognition of the text content in the dashboard to be thus improved.

The performing the multi-scale feature processing on the picture features of the captured picture may be implemented by a preset algorithm for multi-scale feature processing.

Specifically, in a quality control process as shown in FIG. 2, main body feature extraction is first performed on an input picture (i.e., the captured picture as described above) through a lightweight network in a main body network, such as a lightweight network EfficientNetB0Small for optimizing the traditional convolutional neural network (CNN) using a composite zoom method, and is combined with a deep learning segmentation network such as Unet or the like to achieve multi-scale adaption of feature dimensions. That is, the input picture is first down-sampled and then subjected to different levels of convolution and learning to obtain deep features of the input picture (which is implemented in EfficientNetB0Small), which are finally subjected to up-sampling to be restored to a size of the original picture so that the input picture with multi-scale features is obtained, wherein the up-sampling is implemented by deconvolution. Here, the use of the lightweight network to perform the multi-scale feature processing on the picture features of the captured picture can improve the accuracy and efficiency of the processing.

In addition, after the electronic device has performed the multi-scale feature processing on the captured picture of the dashboard, it can further perform feature classification and regression processing on the captured picture with the multi-scale features so as to determine the dial area in the captured picture.

Specifically, as shown in FIG. 2, after obtaining the input picture with the multi-scale features, the electronic device can further classify and regress the input picture with the multi-scale features in East detection of the quality control process. For example, the classification and regression networks can each use a 2-level and 3 by 3 network and one classification layer to extract foreground and regression position information, and in the classification, supervised learning is performed through dice_loss, and in the regression, supervised learning is performed through smooth_l1_loss, so that the position of the dial in the captured picture is determined and the positioning of the dial area in the captured picture can be realized.

Of course, before performing the multi-scale feature processing on the picture features of the captured picture, the electronic device may also pre-process the captured picture. Specifically, the electronic device may crop the captured picture to a preset size, perform mean subtraction processing, and so on.

For example, when receiving the captured picture of the dashboard, the electronic device can uniformly change the input picture to a preset size (such as a scale of 256) according to a long side, so that a processing speed for obtaining the dial picture can be improved. Also, mean subtraction processing can be performed on the picture, so that differences in individual features can be highlighted while the computational complexity is reduced.

In Step 102, at least one text centerline and a bounding box corresponding to each text centerline in the dial picture are detected.

In the present application, after the electronic device obtains the above-mentioned dial picture, it can detect at least one text centerline and at least one bounding box in the dial picture, and the at least one text centerline corresponds to the at least one bounding box in a one-to-one relationship, which means that each text centerline has one corresponding bounding box.

Each of the text centerlines is a centerline of a line of text in the dial picture, and each bounding box is a border formed along an outer edge of the text on the text centerline corresponding to the bounding box.

It should be noted that the detection of the at least one text centerline and the bounding box corresponding to each text centerline in the dial picture can be implemented by means of any preset algorithm for detecting the text centerline and the bounding box, which is not defined here.

Specifically, in the process of an end-to-end recognition shown in FIG. 2 (which can be a one-stage end-to-end recognition), the electronic device can use features of a dial image as an input of a detection branch so as to realize the object of detection of the text centerlines in the dial image and regression of the bounding boxes of the text centerlines. The detection branch is divided into two parts for text centerline detection and text centerline bounding box regression, which are described in detail as follows.

In the text centerline detection, main features (features of the dial image) are first used to derive a feature map of background classification before detection through several convolutional layers, and to derive a single feature map through a convolutional layer of a single filter, so as to characterize the segmentation of foreground and background. The segmented foreground and background are then subjected to supervised learning (such as dice-loss supervised learning) to obtain a feature map with a foreground as 1 and a background as 0, in which a text centerline is in a highlighted form, so as to determine a text center of the dial image.

In the text centerline bounding box regression, the main features are first used to derive high-level features through several convolutional layers, and a classification result which includes a first number of feature maps is obtained through a convolutional layer containing the first number of filters, such as four filters. The first number of feature maps such as four feature maps characterizes distances (x, y) of each pixel from upper and lower boundaries of the centerline. Finally, an outer bounding box of the centerline is obtained with regression by performing supervised leaning, such as smoothl1-loss supervised learning, on the first number of feature maps.

In some embodiments, before step 102, the method further includes performing multi-scale feature processing on picture features of the dial picture to obtain a dial picture with multi-scale features.

Here, the electronic device can perform multi-scale feature processing on a dial image, so that the text recognition process of the dashboard can adapt to dial images of different resolutions, thereby improving the accuracy of text recognition.

The performing the multi-scale feature processing on the picture features of the dial picture can be implemented by a preset algorithm for the multi-scale feature processing.

Specifically, the electronic device can use lightweight networks (such as EfficientNetB0Small, etc.) and Feature Pyramid Networks (FPN) to realize the multi-scale feature processing on the picture features of the dial picture. That is, as shown in FIG. 2, in the main body network of the end-to-end recognition process, the electronic devices use a lightweight network to store the features of different scales of the dial image in different blocks, and then use the FPN to up-sample a high-level feature map which is more abstract and has stronger semantics, so as to obtain an up-sampled feature, which is then connected to the feature of the previous layer. In this way, the high-level features of the dial picture can be enhanced, and the feature map used for prediction in each layer combines different resolutions and features with different semantic strengths, which makes it possible to complete the detection of an object of a corresponding resolution, ensuring that each layer has an appropriate resolution and a strong semantic feature.

Of course, before the above step 102 of detecting the dial picture, the electronic device may also pre-process a dial image. Specifically, before the above step 102, the method may also include pre-processing the dial picture, which includes cropping the dial picture to a preset size, and performing mean subtraction processing on the dial picture, so as not only to increase the processing speed of acquiring the dial picture, but also to reduce the computational complexity and highlight differences in individual features.

In Step 103, text content of each line of text in the dial picture is recognized based on the at least one text centerline and the bounding box corresponding to each text centerline.

In the present application, after the electronic device has detected the at least one text centerline and the bounding box corresponding to each text centerline, it can be recognize the text content of each line of text in the dial picture based on the at least one text centerline and the bounding box corresponding to each text centerline.

The recognition of the text content of each line of text in the dial picture based on the at least one text centerline and the bounding box corresponding to each text centerline can be implemented by any method that is capable of recognizing the text on the centerline of the text based on the text centerline and the bounding box corresponding to each text centerline, which is not defined here.

Specifically, the step 103 may include: acquiring a text feature of at least one sampling point corresponding to a target line of text in the dial picture based on a centerline of a target text and a bounding box corresponding to the centerline of the target text, wherein the target line of text is located in the bounding box corresponding to the centerline of the target text, and the centerline of the target text is any one of the at least one text centerline; serializing the text feature of the at least one sampling point to obtain a target text feature sequence; performing supervised learning on the target text feature sequence through a preset loss function; and decoding the target text feature sequence after the supervised learning to obtain the text content of the target line of text.

Here, by performing feature extraction on the sampling points on the text centerline and performing supervised learning on the extracted features, the recognition of the text content corresponding to the text centerline can be achieved, and the recognition accuracy can be improved.

The electronic device can acquire a text feature of at least one sampling point corresponding to a target line of text in the dial picture based on any text centerline and a bounding box corresponding to the text centerline. For example, it can be implemented through a classic CNN.

Alternatively, the recognition branch shown in FIG. 2 is provided to implement the recognition of a content of a detection output position. In addition, a different recognition task has a different number of classification categories, and the number of the classification categories represents a number of recognized characters. The recognition is implemented as follows: the electronic device can use features output by the main body network in the end-to-end recognition process (that is, features corresponding to the at least one text centerline and the bounding box corresponding to each text centerline) as an input of the recognition branch, extract a text feature, which is a feature in a level of an entire picture and denoted as f_char, through convolutional layers and a number of filters, which is the number of categories plus one (1), and then learn a feature of text on the text centerline based on the feature in the level of the entire picture (i.e., the text feature of the at least one sampling point corresponding to the target line of text), for example, using a deep learning training framework integration tool to perform feature extraction in a gather_nd layer (which supports extraction of discontinuous features from the feature map through multi-dimensional vector indexing). Namely, in a data processing stage, the number of sampling points on the text centerline is preset and a position and a corresponding label of the sampling point, denoted as tcl_pos, are defined through data processing, and the f_char and tcl_pos are then sent to the gather_nd layer to obtain the feature of the sampling point on the text centerline, where the dimension of the feature of the sampling point is the number of categories plus one (1).

In addition, the electronic device can perform supervised learning on the target text feature sequence by using a classic warpctc loss as a loss function, and then obtain a predicted sample output (that is, the text content of the target line of text) through ctc decoding.

In some embodiments, before serializing the text feature of the at least one sampling point, the method further includes performing background suppression processing on the text feature of the at least one sampling point.

The serialization of the text feature of the at least one sampling point includes serializing the text feature of the at least one sampling point obtained after the background suppression processing.

Here, the text features of the sampling points can be subjected to background suppression processing to further improve the accuracy of recognition.

It should be noted that, since the extracted text features of the sampling points include foreground and background information, the electronic device can perform background suppression processing on the extracted text features of the sampling points, for example, by strengthening background of the background map and suppressing background of the foreground map with a mask so as to ensure that the background map has a 100% probability of predicting the background and the foreground map has a 0% probability of predicting the background.

In the present application, by acquiring a dial picture, detecting at least one text centerline and a bounding box corresponding to each text centerline in the dial picture, and recognizing text content of each line of text in the dial picture based on the at least one text centerline and the bounding box corresponding to each text centerline, the electronic device can accurately and quickly recognize the text content in the dial picture, thereby improving the recognition accuracy and efficiency of the metering content of the dashboard.

Figure 3:
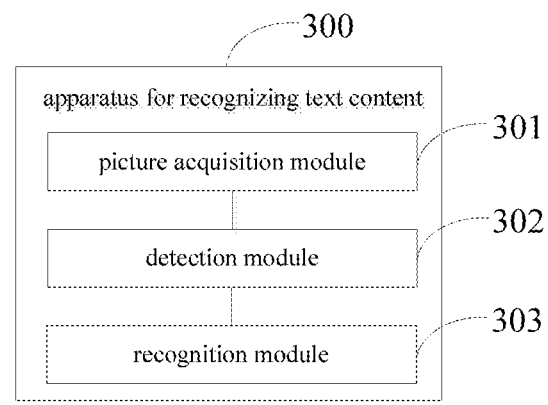
FIG. 3 is a first schematic diagram according to a second embodiment of the present application.

Referring to FIG. 3, an embodiment of the present application provides an apparatus for recognizing text content, which is applied to an electronic device. As shown in FIG. 3, the apparatus 300 for recognizing the text content includes: a picture acquisition module 301, configured to acquire a dial picture; a detection module 302, configured to detect at least one text centerline and a bounding box corresponding to each text centerline in the dial picture; and a recognition module 303, configured to recognize text content of each line of text in the dial picture based on the at least one text centerline and the bounding box corresponding to each text centerline.

Figure 4:
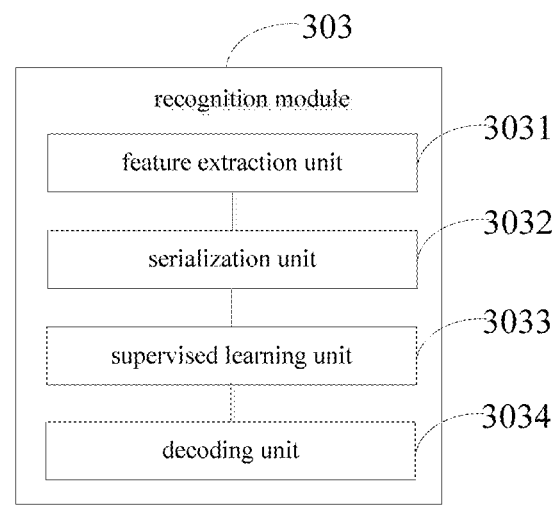
FIG. 4 is a second schematic diagram according to the second embodiment of the present application.

Optionally, as shown in FIG. 4, the recognition module 303 includes a feature acquisition unit 3031, configured to acquire a text feature of at least one sampling point corresponding to a target line of text in the dial picture based on a centerline of a target text and a bounding box corresponding to a centerline of the target text, wherein the target line of text is located in the bounding box corresponding to the centerline of the target text, and the centerline of the target text is any one of the at least one text centerline; a serialization unit 3032, configured to serialize the text feature of the at least one sampling point to obtain a target text feature sequence; a supervised learning unit 3033, configured to perform supervised learning on the target text feature sequence through a preset loss function; and a decoding unit 3034, configured to decode the target text feature sequence after the supervised learning to obtain the text content of the target line of text.

Figure 5:
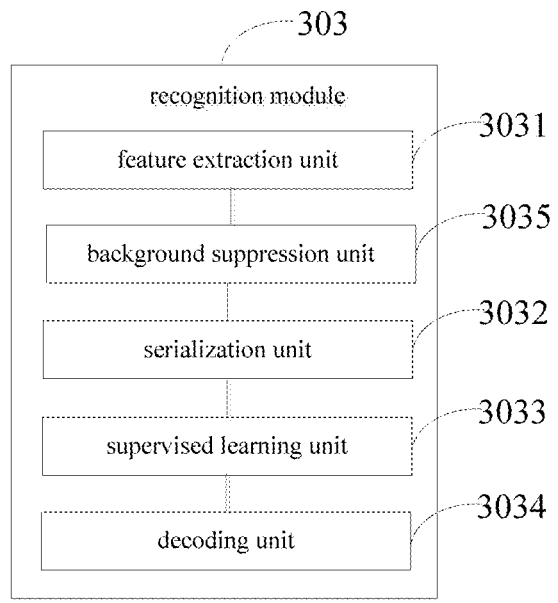
FIG. 5 is a third schematic diagram according to the second embodiment of the present application.

Optionally, as shown in FIG. 5, the recognition module 303 further includes: a background suppression unit 3035, configured to perform background suppression processing on the text feature of the at least one sampling point.

The serialization unit 3032 is specifically used for serializing the text feature of the at least one sampling point obtained after the background suppression processing.

Figure 6:
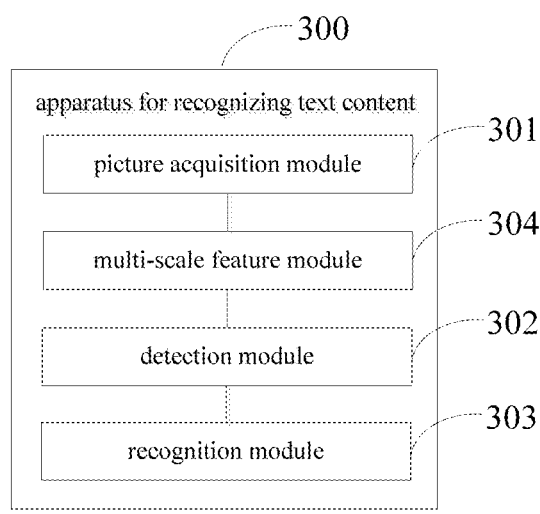
FIG. 6 is a fourth schematic diagram according to the second embodiment of the present application.

Optionally, as shown in FIG. 6, the apparatus 300 further includes a multi-scale feature module 304, configured to perform multi-scale feature processing on picture features of the dial picture to obtain a dial picture with multi-scale features.

Figure 7:
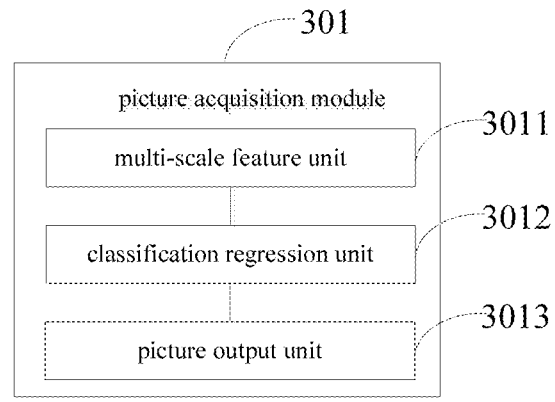
FIG. 7 is a fifth schematic diagram according to the second embodiment of the present application.

Optionally, as shown in FIG. 7, the picture acquisition module 301 includes a multi-scale feature unit 3011, configured to perform multi-scale feature processing on the picture features of the captured picture when the captured picture of the dashboard is received, to obtain a captured picture with multi-scale features; a classification regression unit 3012, configured to perform feature classification and regression processing on the captured picture with the multi-scale features to determine a dial area in the captured picture; and a picture output unit 3013, configured to output a picture of the dial area as the dial picture.

Figure 8:
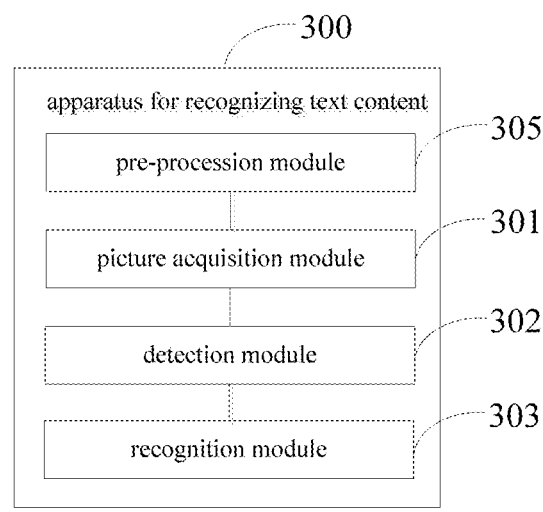
FIG. 8 is a sixth schematic diagram according to the second embodiment of the present application.

Optionally, as shown in FIG. 8, the apparatus 300 further includes a pre-procession module 305, configured to pre-process the dial picture, which includes cropping the dial picture to a preset size, and performing mean subtraction processing on the dial picture.

It should be noted that the apparatus 300 for recognizing the text content can implement various processes implemented by the electronic device in the method embodiment of FIG. 1 of the present application, and achieve the same beneficial effects. To avoid repetition, details are not repeated here.

According to the embodiments of the present application, the present application further provides an electronic device and a readable storage medium.

Figure 9:
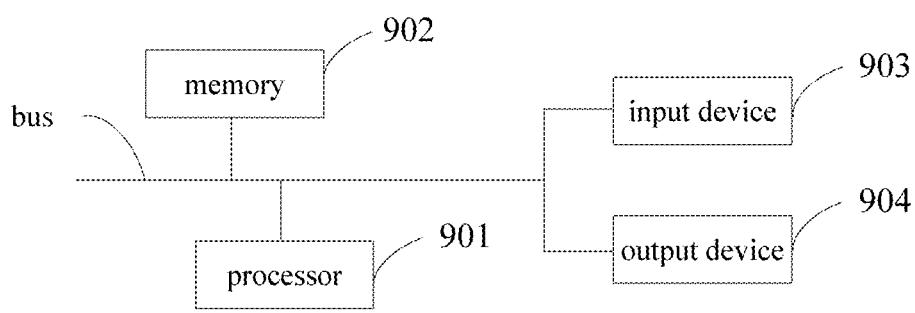
FIG. 9 is a block diagram of an electronic device used to implement the method for recognizing text content in an embodiment of the present application.

As shown in FIG. 9, it is a block diagram of an electronic device according to a method for recognizing text content according to an embodiment of the present application. The electronic devices are intended to represent various forms of digital computers, such as laptop computers, desktop computers, platforms, personal digital assistants, servers, blade servers, mainframe computers, and other suitable computers. The electronic devices can also represent various forms of mobile devices, such as personal digital assistants, cellular phones, smart phones, wearable devices, and other similar computing devices. The components, their connections and relationships as well as their functions shown herein are merely examples, and are not intended to limit the implementation of the present application described and/or claimed herein.

As shown in FIG. 9, the electronic devices include one or more processors 901, a memory 902, and interfaces for connecting various components, including high-speed interfaces and low-speed interfaces. The various components are connected to each other via different buses, and can be mounted on a common mainboard, or mounted in another manner as required. The processor can process instructions that are executed in the electronic devices, including instructions stored in or on the memory to display graphical information of the GUI on an external input/output device, such as a display device coupled to the interface. In other embodiments, multiple processors and/or multiple buses may be used with multiple memories, if necessary. Similarly, multiple electronic devices can be connected, each providing some necessary operations (for example, serving as a server array, a group of blade servers, or a multi-processor system). One processor 901 is shown as an example in FIG. 9.

The memory 902 is a non-transitory computer-readable storage medium provided by the present application. The memory has stored thereon instructions that are executable by at least one processor so that the at least one processor executes the method for recognizing the text content provided in the present application. The non-transitory computer-readable storage medium of the present application has stored thereon computer instructions, which are used to cause the computer to execute the method for recognizing the text content provided by the present application.

As a non-transitory computer-readable storage medium, the memory 902 can be used to store non-transitory software programs, non-transitory computer executable programs, and modules, such as program instructions/modules corresponding to the method for recognizing the text content in the embodiment of the present application, for example, the picture acquisition module 301, the detection module 302, and the recognition module 303 as shown in FIG. 3. The processor 901 executes various functional applications of the server and data processing by running the non-transient software programs, instructions and modules stored in the memory 902. That is, it realizes the method for recognizing the text content in the foregoing method embodiments.

The memory 902 may include a program storage area, which can store an operating system and an application required by at least one function, and a data storage area, which can store data created according to the use of the electronic devices for the detection of echo delay, or the like. In addition, the memory 902 may include a high-speed random access memory, and may also include a non-transitory memory, such as at least one magnetic disk storage device, flash memory devices, or other non-transitory solid-state storage devices. In some embodiments, the memory 902 may optionally include storages that are remotely located from the processor 901, and these remote storages may be connected to the electronic devices for the detection of the echo delay via a network. Examples of the aforementioned network include, but are not limited to, internets, corporate intranets, local area networks, mobile communication networks, and combinations thereof.

The electronic devices for the method for recognizing the text content may further include an input device 903 and an output device 904. The processor 901, the memory 902, the input device 903, and the output device 904 may be connected via a bus or in other ways. The connections via buses are shown as an example in FIG. 9.

The input device 903 can receive input digital or character information, and generate key signal inputs related to user settings and function control of the electronic devices for the detection of echo delay, and may be, for example, a touch screen, a keypad, a mouse, a trackpad, a touchpad, a pointing stick, one or more mouse buttons, a trackball or a joystick. The output device 904 may include a display device, an auxiliary lighting device such as a light-emitting diode (LED), and a tactile feedback device such as a vibration motor. The display device may include, but is not limited to, a liquid crystal display (LCD), a light-emitting diode (LED) display, and a plasma display. In some embodiments, the display device may be a touch screen.

Various implementations of the systems and techniques described herein can be implemented in a digital electronic circuit system, an integrated circuit system, an application specific integrated circuit (ASIC), computer hardware, firmware, software, and/or a combination thereof. These various implementations may include implementation in one or more computer programs, which may be executed and/or interpreted on a programmable system including at least one programmable processor. The programmable processor can be a dedicated or general-purpose programmable processor that can receive data and instructions from, and transmit data and instructions to, a storage system, at least one input device, and at least one output device.

These computer programs (also called programs, software, software applications, or codes) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor, including a machine-readable medium that receives a machine-readable signal.

The term "machine-readable signal" refers to any signal to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the present application, by acquiring a dial picture, detecting at least one text centerline and a bounding box corresponding to each text centerline in the dial picture, and recognizing text content in each line of text in the dial picture based on the at least one text centerline and the bounding box corresponding to each text centerline, the electronic device can accurately and quickly recognize the text content in the dial picture, thereby improving the recognition accuracy and efficiency of the metering content of the dashboard.

It should be understood that the steps can be reordered, added or deleted on the basis of the various forms of processes shown above. For example, the steps described in the present application can be executed in parallel, sequentially, or in a different order, so long as the desired result of the technical solution disclosed in the present application can be achieved, and this is not limited herein.

The above specific implementations do not constitute a limitation on the scope of protection of the present application. Those skilled in the art should understand that various modifications, combinations, sub-combinations, and substitutions can be made according to design requirements and other factors. Any modifications, equivalent substitutions and improvements made within the spirit and principles of the present application shall be encompassed in the scope of protection of the present application.

What is claimed is:

1. A method for recognizing a text content, applied to an electronic device, comprising:

acquiring a dial picture;

detecting at least one text centerline and a bounding box corresponding to each text centerline in the dial picture; and recognizing a text content in each line of text in the dial picture based on the at least one text centerline and the bounding box corresponding to each text centerline;

wherein before the detection of the at least one text centerline and the bounding box corresponding to each text centerline in the dial picture, the method further comprises:

pre-processing the dial picture, which comprises cropping the dial picture to a preset size, and performing mean subtraction processing on the dial picture.

2. The method according to claim 1, wherein the recognition of the text content in each line of text in the dial picture based on the at least one text centerline and the bounding box corresponding to each text centerline comprises:

acquiring a text feature of at least one sampling point corresponding to a target line of text in the dial picture based on a centerline of a target text and a bounding box corresponding to the centerline of the target text, wherein the target line of text is located in the bounding box corresponding to the centerline of the target text, and the centerline of the target text is any one of the at least one text centerline;

serializing the text feature of the at least one sampling point to obtain a target text feature sequence;

performing supervised learning on the target text feature sequence through a preset loss function; and decoding the target text feature sequence after the supervised learning to obtain the text content of the target line of text.

3. The method according to claim 2, wherein before the serializing the text feature of the at least one sampling point, the method further comprises performing background suppression processing on the text feature of the at least one sampling point; and the serialization of the text feature of the at least one sampling point comprises serializing the text feature of the at least one sampling point obtained after the background suppression processing.

4. The method according to claim 1, wherein before the detection of the at least one text centerline and the bounding box corresponding to each text centerline in the dial picture, the method further comprises:

performing multi-scale feature processing on picture features of the dial picture to obtain a dial picture with multi-scale features.

5. The method according to claim 1, wherein the acquisition of the dial picture comprises:

performing multi-scale feature processing on picture features of a captured picture of a dashboard to obtain a captured picture with multi-scale features when receiving the captured picture of the dashboard;

performing feature classification and regression processing on the captured picture with the multi-scale features to determine a dial area in the captured picture; and outputting a picture of the dial area as the dial picture.

6. The method according to claim 1, wherein the dial picture includes an image of an area where a dial of the dashboard is located in a captured picture, and the dial refers to an area where a display screen of a dashboard is located.

7. An electronic device, comprising:

at least one processor; and a memory communicatively coupled to the at least one processor;

wherein the memory has instructions stored thereon and executable by the at least one processor, which are executed by the at least one processor to enable the at least one processor to perform a method for recognizing a text content, applied to the electronic device, comprising:

acquiring a dial picture;

detecting at least one text centerline and a bounding box corresponding to each text centerline in the dial picture; and recognizing a text content in each line of text in the dial picture based on the at least one text centerline and the bounding box corresponding to each text centerline;

wherein before the detection of the at least one text centerline and the bounding box corresponding to each text centerline in the dial picture, the method further comprises:

pre-processing the dial picture, which comprises cropping the dial picture to a preset size, and performing mean subtraction processing on the dial picture.

8. The electronic device according to claim 7, wherein the recognition of the text content in each line of text in the dial picture based on the at least one text centerline and the bounding box corresponding to each text centerline comprises:

acquiring a text feature of at least one sampling point corresponding to a target line of text in the dial picture based on a centerline of a target text and a bounding box corresponding to the centerline of the target text, wherein the target line of text is located in the bounding box corresponding to the centerline of the target text, and the centerline of the target text is any one of the at least one text centerline;

serializing the text feature of the at least one sampling point to obtain a target text feature sequence;

performing supervised learning on the target text feature sequence through a preset loss function; and decoding the target text feature sequence after the supervised learning to obtain the text content of the target line of text.

9. The electronic device according to claim 8, wherein before the serializing the text feature of the at least one sampling point, the method further comprises performing background suppression processing on the text feature of the at least one sampling point; and the serialization of the text feature of the at least one sampling point comprises serializing the text feature of the at least one sampling point obtained after the background suppression processing.

10. The electronic device according to claim 7, wherein before the detection of the at least one text centerline and the bounding box corresponding to each text centerline in the dial picture, the method further comprises:

performing multi-scale feature processing on picture features of the dial picture to obtain a dial picture with multi-scale features.

11. The electronic device according to claim 7, wherein the acquisition of the dial picture comprises:

performing multi-scale feature processing on picture features of a captured picture of a dashboard to obtain a captured picture with multi-scale features when receiving the captured picture of the dashboard;

performing feature classification and regression processing on the captured picture with the multi-scale features to determine a dial area in the captured picture; and outputting a picture of the dial area as the dial picture.

12. The electronic device according to claim 7, wherein the dial picture includes an image of an area where a dial of the dashboard is located in a captured picture, and the dial refers to an area where a display screen of a dashboard is located.

13. A non-transitory computer-readable storage medium having computer instructions stored thereon, which are used to realize a method for recognizing a text content, applied to the electronic device, comprising:
    acquiring a dial picture;
    detecting at least one text centerline and a bounding box corresponding to each text centerline in the dial picture; and
    recognizing a text content in each line of text in the dial picture based on the at least one text centerline and the bounding box corresponding to each text centerline;
    wherein before the detection of the at least one text centerline and the bounding box corresponding to each text centerline in the dial picture, the method further comprises:
    pre-processing the dial picture, which comprises cropping the dial picture to a preset size, and performing mean subtraction processing on the dial picture.

14. The non-transitory computer-readable storage medium according to claim 13, wherein the recognition of the text content in each line of text in the dial picture based on the at least one text centerline and the bounding box corresponding to each text centerline comprises:
    acquiring a text feature of at least one sampling point corresponding to a target line of text in the dial picture based on a centerline of a target text and a bounding box corresponding to the centerline of the target text, wherein the target line of text is located in the bounding box corresponding to the centerline of the target text, and the centerline of the target text is any one of the at least one text centerline;
    serializing the text feature of the at least one sampling point to obtain a target text feature sequence;
    performing supervised learning on the target text feature sequence through a preset loss function; and
    decoding the target text feature sequence after the supervised learning to obtain the text content of the target line of text.

15. The non-transitory computer-readable storage medium according to claim 14, wherein before the serializing the text feature of the at least one sampling point, the method further comprises performing background suppression processing on the text feature of the at least one sampling point; and
    the serialization of the text feature of the at least one sampling point comprises serializing the text feature of the at least one sampling point obtained after the background suppression processing.

16. The non-transitory computer-readable storage medium according to claim 13, wherein before the detection of the at least one text centerline and the bounding box corresponding to each text centerline in the dial picture, the method further comprises:
    performing multi-scale feature processing on picture features of the dial picture to obtain a dial picture with multi-scale features.

17. The non-transitory computer-readable storage medium according to claim 13, wherein the acquisition of the dial picture comprises:
    performing multi-scale feature processing on picture features of a captured picture of a dashboard to obtain a captured picture with multi-scale features when receiving the captured picture of the dashboard;
    performing feature classification and regression processing on the captured picture with the multi-scale features to determine a dial area in the captured picture; and
    outputting a picture of the dial area as the dial picture.

* * * * *